June 26, 1956  F. J. BIEBER  2,751,675
METHOD OF FORMING METALLIC SPOOLS
Filed Sept. 8, 1953
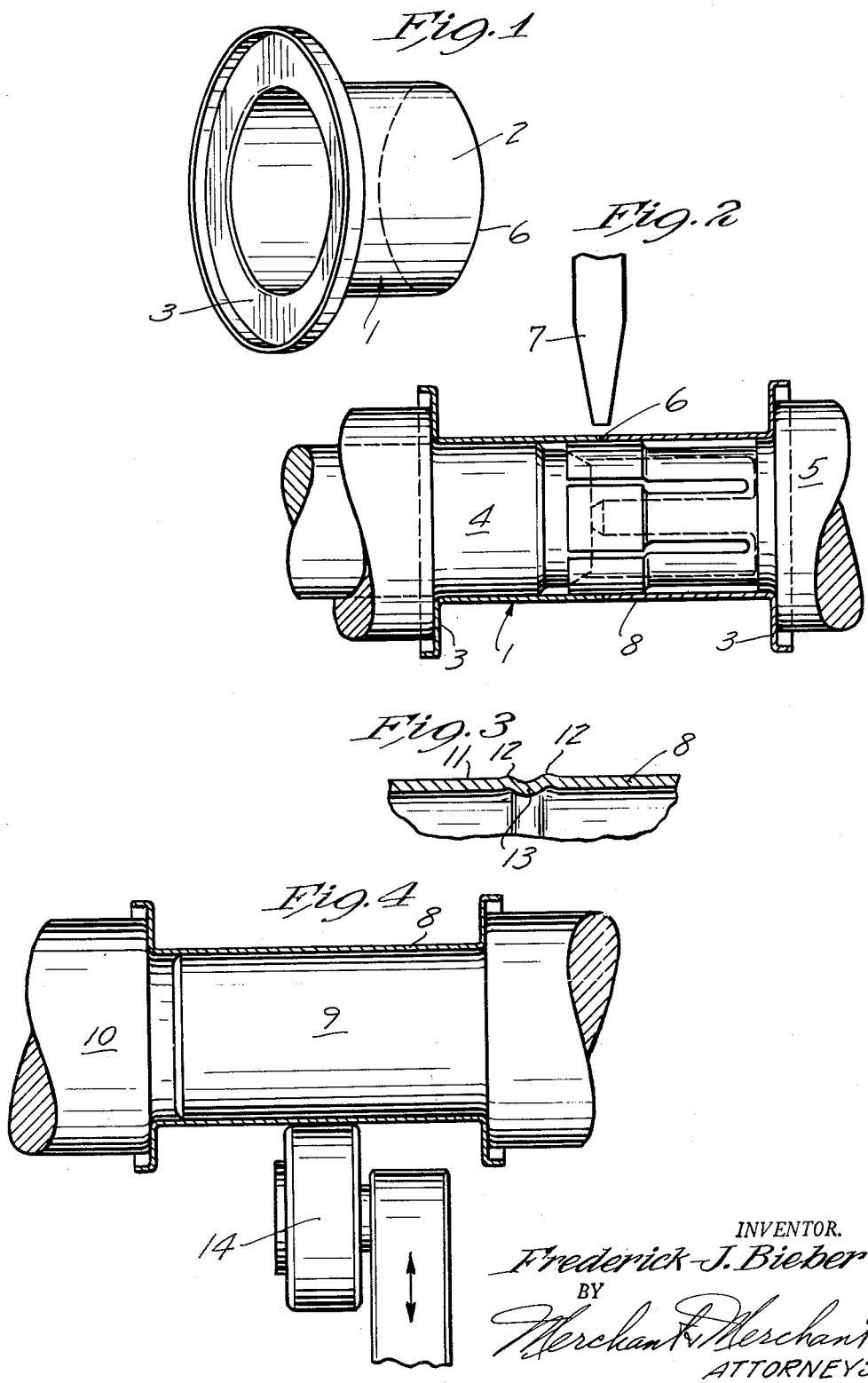
INVENTOR.
Frederick J. Bieber
BY
Merchant & Merchant
ATTORNEYS

United States Patent Office 2,751,675
Patented June 26, 1956

2,751,675
METHOD OF FORMING METALLIC SPOOLS

Frederick J. Bieber, Minneapolis, Minn., assignor to Acrometal Products, Inc., Minneapolis, Minn., a corporation of Minnesota Application September 8, 1953, Serial No. 378,717

1 Claim. (Cl. 29—463)

My invention relates to the manufacture of relatively small metallic spools of the type utilized in the winding of wire or the like.

The primary object of my invention is the provision of a spool of the type described which is light in weight, relatively inexpensive to manufacture, and yet is sufficiently rugged and durable in construction so as to permit its use and reuse on modern high-speed wire coil winding machines or similar equipment. To this end I have found that spool sections including cylindrical tubular drum-forming elements each having a radially extended annular flange at one end, may be pressed from light sheet material such as aluminum. I have further found that when said sections are placed upon an expanding mandrel and locked together in axial alignment with the non-flanged ends held in tight abutment, the abutting edges may be electro-welded together by suitable welding methods and equipments such as "Heliarc" where aluminum is used. The welding electrode is held stationary against the abutting ends while the mandrel is rotated. However, I have found that the welding of the sections together results not only in surface irregularities such as annular ridges and grooves being formed at and adjacent the weld, but also that the metal at and adjacent the weld becomes softened by the heat. To remove these surface irregularities and to restore the hardness of the metal at and adjacent the weld, I place the welded spool on a second rotating mandrel and tightly press the hardened roller against this area during rotation.

The above described structure and method will become apparent from the following detailed specification, appended claim and attached drawings.

Referring to the drawings, wherein like characters indicate like parts throughout the several views:

Fig. 1 is a view in perspective of one of the sections from which my novel spool is formed;

Fig. 2 is a view partly in axial section and partly in top plan illustrating one of the steps in the process of forming my novel spool, some parts being broken away;

Fig. 3 is a greatly enlarged fragmentary view showing the sections immediately after welding; and Fig. 4 is a view corresponding to Fig. 2 but illustrating a further step in the formation of my novel spools.

Referring with greater particularity to the drawings, the numeral 1 indicates in its entirety a spool section preferably drawn from flat sheets of metal such as aluminum. Section 1 includes a cylindrical tubular drum-forming element 2 and a radially extending annular flange 3. To form a spool from a pair of identical sections 1, I first place same on an expanding mandrel of conventional design, the male portion of which is identified by the numeral 4, and the tubular slotted female portion of which is identified by the numeral 5. It will be noted that the several sections 1 are in axial alignment with their un-flanged edges 6 held in tight abutment. The mandrel 4—5 is rotated while the electrode 7 of a conventional electro-welding apparatus (such as a "Heliarc" welder where aluminum is used) is held against or in sufficiently close proximity to the abutting edges 6 to cause welding thereof.

After welding together of the sections 1 by the above method, the spool 8 is removed from the expanding mandrel 4—5 and placed upon preferably a second mandrel 9 of the type which merely snugly frictionally engages the interior surface 10 thereof. As above indicated, during the welding process, irregularities in the exterior surface 11 of the spool 8, generally in the nature of annular raised ridges or ribs 12 and grooves 13 (see particularly Fig. 3) are created; and the temper of the metal at and adjacent the welded edges 6 is partially destroyed. To restore the hardness to the area of the metal adjacent the weld, to approximately that of the parent metal, and to remove the irregularities or ribs and grooves 12 and 13, I force a hardened roller 14 against said weld and adjacent area while the spool 8 is being rotated upon the mandrel 9. As the roller 14 is moved back and forth across this area, the ridges 12 and the grooves 13 are completely ironed out and this working of the material heats same to a point where the hardness is substantially restored.

My above described method and the spools produced thereby have been thoroughly tested and found to be completely satisfactory for the accomplishment of the above objects, and while I have disclosed a preferred embodiment of my invention, I wish it to be understood that the same is capable of modification without departure from the scope of the appended claim.

What I claim is:

The method of forming a metallic spool which comprises forming from flat sheet stock a pair of spool sections each including a tubular drum element having a radially projecting annular flange at one end, placing said elements on a rotating expanding mandrel with said drum elements in axial alignment and with their edges in tight abutment, rotating said elements while an electro-welding device is brought to bear upon the abutting edges of said spool elements whereby to weld said sections together, and finally rotating said spool on a second rotating mandrel while forcing a hardened roller against and adjacent to said welded area to remove the surface irregularities caused by said welding, and to restore the hardness of the metal rendered soft by said welding.

References Cited in the file of this patent

UNITED STATES PATENTS

| | | |
|---|---|---|
| 1,779,607 | Lewis | Oct. 28, 1930 |
| 2,025,922 | Weinrich | Dec. 31, 1935 |